United States Patent [19]
Levy

[11] 3,882,171
[45] May 6, 1975

[54] HYDROGENATION OF NITROBENZOIC ACIDS

[75] Inventor: Joseph Levy, Northbrook, Ill.

[73] Assignee: Universal Oil Products Company, Des Plaines, Ill.

[22] Filed: Sept. 27, 1973

[21] Appl. No.: 401,309

Related U.S. Application Data

[63] Continuation-in-part of Ser. No. 132,168, April 21, 1971, abandoned.

[52] U.S. Cl. ............................................. 260/518 R
[51] Int. Cl. ................... C07c 101/54; C07c 101/56
[58] Field of Search ............................... 260/518 R

[56] References Cited
UNITED STATES PATENTS 3,324,175   6/1967   Mallonee ...................... 260/518 R

*Primary Examiner*—Lorraine A. Weinberger
*Assistant Examiner*—L. A. Thaxton
*Attorney, Agent, or Firm*—James R. Hoatson, Jr.; Raymond H. Nelson; William H. Page, II

[57] ABSTRACT

The hydrogenation of nitrobenzoic acids to the corresponding aminobenzoic acids is effected in an aqueous solution of an alkali metal salt thereof adjusted to a pH of from about 5 to about 7, by treating with hydrogen at a pressure less than about 100 psig. in the presence of a hydrogenation catalyst.

10 Claims, No Drawings

HYDROGENATION OF NITROBENZOIC ACIDS

CROSS-REFERENCE TO RELATED APPLICATIONS

This application is a continuation-in-part of my copending application Ser. No. 132,168 filed Apr. 21, 1971 now abandoned.

BACKGROUND OF THE INVENTION

Aminobenzoic acids and water-soluble salts thereof are important intermediates for dyes, antioxidants, developers, pharmaceuticals, and other products. For example, various esters of p-aminobenzoic acid are of special importance because of their local anesthetic properties as, for example, those esters used under the trade name Anesthesine, Butesin, Novacain (Procaine), and Butyn.

Numerous processes have been proposed in the prior art for the manufacture of the isomeric aminobenzoic acids and more recent developments in the manufacturing processes have been to the reduction of nitrobenzoic acid with hydrogen in the presence of a hydrogenation catalyst. While said processes have constituted improvements over the prior processes, difficulties are still encountered in an attempt to produce high yields of high purity products. For example as stated in U.S. Pat. No. 3,324,175, the process described in a prior U.S. Pat., namely, No. 2,947,781, involving reduction of p-nitrobenzoic acid in aqueous medium is limited by the amount of the acid which can be held in solution in the water and to increase the output it is necessary to use a suspension of the nitrobenzoic acid. As an improvement over this process U.S. Pat. No. 3,324,175 discloses the use of a mixture of ammonium and sodium salts of p-nitrobenzoic acid for hydrogenation. However, the patentee has cited the importance of using a very narrow pH range which he has found to be critical of from 7.0 to 7.5, the patentee stating that a pH above the upper limit leads to the formation in the hydrogenation reaction of undesirable azo, hydrazo, azoxy, and related products which not only reduces the yield of the desired acid but, in addition, will also discolor and otherwise affect the quality of the product. The patentee further states that at a pH below 7.0 the p-aminobenzoic acid tends to be separated from its salt mixture and that such a separation may result in a loss of product in a subsequent filtering step which is required to remove the catalyst. In addition to this narrow pH range, the patentee also has stated that the process is operated with a hydrogen pressure between 100 psig. and 600 psig. and that at a pressure lower than 100 psig. the reaction is slow and less practical.

In contradistinction to the statements set forth in this patent, I have now discovered that substantially quantitative yields of the desired product, greater than 95 percent with a corresponding high purity may be obtained by effecting the process under mildly acidic conditions at pH's ranging from about 5 to about 7 and at hydrogen pressures less than 100 psig. in an aqueous solution of an alkali metal salt of the nitrobenzoic acid, the pH of which has been adjusted to the aforesaid range of about 5 to 7.

This invention relates to a process for obtaining high yields of high purity aminobenzoic acids. More specifically the invention is concerned with a process for obtaining high yields of high purity aminobenzoic acids by hydrogenating the corresponding nitrobenzoic acid in the presence of a hydrogenation catalyst under certain reaction conditions hereinafter set forth in greater detail.

As hereinbefore set forth it has now been discovered that high yields of high purity aminobenzoic acids may be obtained by effecting the catalytic reduction of the corresponding nitrobenzoic acids as alkali metal salts thereof in an aqueous solution at an acidic pH ranging from about 5 to about 7.

By utilizing the novel process of the present invention, the complications of utilizing ammonium salts in admixture with alkali metal salts as well as the necessity for operating the reaction within a very limited alkaline pH range will be avoided. In addition, it is also possible to effect the reaction of the present invention at a relatively low hydrogen pressure, said pressure being less than about 100 psig. By utilizing this low hydrogen pressure, it is possible to employ less expensive reaction vessels, this being in contradistinction to the prior art which has taught that a pressure of at least 100 psig. is required and that pressures in the range of from about 100 psig. to about 600 psig. are employed, the employment of such pressures thus necessitating the use of more expensive pressure equipment such as autoclaves. Moreover, under the conditions of this invention no difficulties are met in preventing loss of product during filtration of catalyst.

It is therefore an object of this invention to provide an improved process for the hydrogenation of nitrobenzoic acids to the corresponding aminobenzoic acids.

In one aspect an embodiment of this invention resides in a process for the hydrogenation of nitrobenzoic acid, the improvement which comprises hydrogenating said nitrobenzoic acid at a hydrogen pressure less than about 100 psig. and at a pH of from about 5 to about 7 in the presence of a hydrogenation catalyst in a solution consisting essentially of said acid dissolved in an aqueous solution of from about 0.95 to about 1.0 equivalents of an alkali metal hydroxide, carbonate or bicarbonate.

A specific embodiment of this invention is found in a process for the hydrogenation of p-nitrobenzoic acid, the improvement of said process comprising hydrogenating said p-nitrobenzoic acid at a hydrogen pressure in the range of from about 30 to about 50 psig. and at a pH of about 5.7 in the presence of a hydrogenation catalyst comprising a palladium-charcoal composite, the reaction being effected in a solution consisting essentially of said p-nitrobenzoic acid dissolved in an aqueous solution of about 0.97 equivalents of sodium hydroxide.

Other objects and embodiments will be found in the following further detailed description of the present invention.

As hereinbefore set forth the present invention is concerned with an improvement in a process for the hydrogenation of nitrobenzoic acids to form the corresponding aminobenzoic acids, said process being effected in a more convenient manner than that which has been set forth in the prior art, the details of said operation being hereinafter set forth in greater detail. Any suitable nitrobenzoic acid may be hydrogenated in accordance with the present invention and thus will include o-nitrobenzoic acid, m-nitrobenzoic acid, and particularly, p-nitrobenzoic acid, as well as substituted nitrobenzoic acids. As hereinbefore set forth the hydrogenation is effected in an aqueous solution at a pH which is acidic in nature of from about 5 to about 7. The nitrobenzoic acid will be in solution substantially as in alkali metal salt although at the desired operating pH range of from about 5 to 7 about 1 to about 5 percent of the free acid will be present. Sufficient water will be used in order to obtain complete solution of the alkali metal salt plus free acid and may comprise an aqueous solution containing from about 10 to about 50 percent, and preferably from 25 to about 35 percent, by weight of the alkali metal nitrobenzoic acid salt. In a preferred embodiment of the invention the nitrobenzoic acid is in the aqueous solution substantially as the sodium salt. Other alkali metal salts which may be used will include, for example, the potassium salts, lithium salts, rubidium salts, cesium salts, etc. but these appear to offer no advantage over the sodium salt. The salt may be prepared in any suitable manner and preferably by reacting the acid in situ with an aqueous solution of an alkali metal hydroxide. In another embodiment the corresponding alkali metal carbonate or bicarbonate such as sodium carbonate, sodium bicarbonate, potassium carbonate, potassium bicarbonate, lithium carbonate, lithium bicarbonate, etc. may be used. The ph within the desired range may be adjusted by adding mineral acids or organic acids such as sulfuric acid, hydrochloric acid, acetic acid, etc. or by using a deficiency of the alkali metal hydroxide carbonate or bicarbonate as desired. It is to be understood that the preferred alkali metal salt of the nitrobenzoic acid may also be dissolved in an aqueous solution and the pH adjusted as desired.

When desired, and particularly when the nitrobenzoic acid charge is impure, charcoal or other decolorizing agents are included in the reaction mixture. In general, the amount of charcoal or other decolorizing agent will be present within the range of from about 1 to about 5 percent or more by weight of the nitrobenzoic acid, the greater the amount of impurity of the charge the more decolorizing agent will be present.

The hydrogenation of the nitrobenzoic acid will be effected and will proceed rapidly at low hydrogen pressures ranging from about 5 to about 100 psig. and preferably from about 10 to about 50 psig. which, as hereinbefore set forth, differs from the pressures used in the prior art and will also offer important advantages over the use of higher pressures. For example, the necessity for the use of high pressure equipment will be eliminated and, in addition, it has been found that the reaction will proceed at a rapid rate as opposed to the statements of the prior art which claim the process will proceed in a slow manner when using pressures less than 100 psig. However, it is to be understood that as advantages appear therefor, higher pressures may be employed, said pressures ranging up to 500 psig. or more but generally there are no advantages to these higher pressures and accordingly they are not preferred.

The hydrogenation proceeds satisfactorily at temperatures of from about 50° to about 100° C., although higher temperatures may be employed when desired. Preferred temperatures are from about 70° to about 100° C. and generally there is no advantage to going to higher temperatures which, in turn, would require additional expenses in heating and subsequent cooling facilities. The hydrogenation will be continued until the desired hydrogen consumption has occurred and generally will be within the range of from about 2 to about 10 and more particularly from about 2 to about 5 hours.

Any suitable hydrogenation catalyst may be employed and preferably is a noble metal catalyst including, for example, palladium, platinum, rhodium, ruthenium, etc., oxides thereof, or mixtures of these. Preferably the noble metal catalyst is supported on a suitable carrier including carbon, alumina, silica, etc., or mixtures thereof. The composite may contain the active catalyst in a concentration of from about 0.5 to about 25 percent and preferably from about 1 to about 5 percent by weight. As another advantage to the process of the present invention, the amount of catalyst utilized is very low and, as will be shown by the appended examples, as little as 0.05 grams of a 5 percent palladium on charcoal catalyst were used per 50 grams of p-nitrobenzoic acid. In general, the amount of catalyst will be within the range of from about 0.05 to about 5 percent and preferably from about 0.1 to about 1 percent by weight of catalyst based on the nitrobenzoic acid charge. However, it is understood that sufficient catalyst will be used to effect the desired hydrogenation.

The hydrogenation of the nitrobenzoic acid is effected in any suitable manner and may comprise either a batch or continuous type operation. In a preferred embodiment of the invention, the reaction is effected in a low pressure vessel capable of operating at up to about 100 psig. which may be equipped with suitable stirring and heating means and in addition provided with suitable inlet and outlet means. In this method, the aqueous solution of the nitrobenzoic acid salt plus catalyst is charged to the vessel which is then pressured with hydrogen to the desired pressure within the range hereinbefore set forth, that is, less than 100 psig. and preferably from about 10 to about 50 psig., following which the charge is then heated to the desired operating temperature. In a continuous type process the catalyst may be disposed as a fixed bed in the reaction zone and the aqueous nitrobenzoic acid solution and hydrogen are passed through said zone in either an upward or downward flow in contact therewith.

When utilizing a batch type process, after completion of the hydrogenation, the reaction mixture is recovered and filtered to remove the catalyst, said filtering step being preferably effected at a temperature of at least 50° C. and generally not in excess of about 100° C. Under these conditions no separation of product takes place during filtration. As another advantage to the process of the present invention, the catalyst may be repeatedly reused for the hydrogenation of additional nitrobenzoic acid charges with incremental additions of only relatively small amounts of fresh catlayst.

Because the product is sensitive to air oxidation, preferably a suitable protecting agent, such as sodium hydrosulfite, is added to the filtrate. Only a relatively small of sodium hydrosulfite is required. In another method, air may be excluded by conducting the filtration and precipitation under a non-oxidizing atmosphere, such as nitrogen, etc. After removal of the catalsyt, the aminobenzoic acid is precipitated by the addition of a mineral acid to a pH of about 4 and cooled to room temperature. Any suitable mineral acid may be employed and may be selected from hydrochloric acid, sulfuric acid, phosphoric acid, etc. The precipitated product is filtered from the aqueous menstruum and preferably is washed with water to remove inorganic salts, after which it may be dried in any suitable manner as, for example, by heating in a vacuum oven. The aminobenzoic acid is obtained in yields of about 95 percent or greater and in a high state of purity.

As hereinbefore set forth the nitrobenzoic acid is admixed with an aqueous solution of an alkali metal salt only to form the alkali metal nitrobenzoic acid salt, there being no ammonium salt present in the resultant solution. This is in contradistinction to the catalytic system of the prior art which taught that the solution is a mixture of ammonium and alkali metal salts. It was therefore unexpected, as will hereafter be shown in the appended examples, that it was possible to obtain high yields of high purity product by omitting what has previously been thought of as an essential element in the catalytic system.

The following examples are given to illustrate the process of the present invention which, however, are not intended to limit the generally broad scope of the present invention in strict accordance therewith.

EXAMPLE I

The charge in this example comprised 23 grams of 50 percent aqueous sodium hydroxide (0.29 moles), 50 grams of p-nitrobenzoic acid (0.30 moles) and 85 grams of water. The mixture was heated to about 75° C. until the acid was completely dissolved. The pH of the solution was about 5.7. To this solution were added 0.05 grams of 5% palladium on charcoal catalyst and 1.0 grams of decolorizing charcoal. The mixture was then reduced in a Parr hydrogenation apparatus at about 75°–90° C. and under a hydrogen pressure of about 30–50 psig. until hydrogen ceased to be absorbed. About 2¼ hours were required to complete the reaction, after which the catalyst was filtered at about 65° C. A pinch of sodium hydrosulfite was added to the practically colorless filtrate to prevent air oxidation and the consequent development of a yellow color. The p-aminobenzoic acid then was precipitated by the gradual addition with vigorous stirring of about 39.4 grams of 50 percent sulfuric acid until a pH of about 3.8 was reached. A white granular solid separated and, after cooling to about 15° C., the product was filtered, washed with 100 ml of water to remove inorganic salts, and dried in vacuo at about 75° C. to give 39.3 grams of p-aminobenzoic acid (96% yield).

Analysis of the product confirmed the high purity thereof. The product was a white granular solid, having a melting point of 187.8°–188.5° C. and otherwise met prevailing specifications.

EXAMPLE II

Another run was made in substantially the same manner as described in Example I except that the charcoal was omitted. The charge comprised 50 grams of p-nitrobenzoic acid, 24 grams of 50 percent aqueous sodium hydroxide, 100 grams of water and 0.5 grams of palladium-charcoal catalyst. The reaction was effected at a pH of 6.3 and under a hydrogen pressure of 30–50 psig. for 4½ hours. The yield amounted to 97 percent by weight of white solid product having a melting point of 188°–190° C.

EXAMPLE III

Another run was made in substantially the same manner as described in Example I except that potassium hydroxide was used instead of sodium hydroxide and p-nitrobenzoic acid was converted substantially to its potassium salt. The reaction was effected at a pH of about 6.8 for 2¾ hours. A 97 percent yield of product was recovered as a white granular solid having a melting point of 190° C.

EXAMPLE IV

A run was made in substantially the same manner as described in Example I except that 0.1 grams of 5 percent platinum on charcoal catalyst was used instead of palladium-charcoal catalyst. This reaction was carried out at a pH of about 6.0 for 3 hours. A 96 percent yield of a white, granular product was obtained having a melting point of 190° C.

EXAMPLE V

In this example the method substantially as described in Example I above is utilized except that the charge comprises o-nitrobenzoic acid in place of the p-nitrobenzoic acid of Example I. The charge is prepared by admixing 23 grams of 50 percent aqueous sodium hydroxide along with 50 grams of o-nitrobenzoic acid and 85 grams of water. The mixture is heated until dissolved and 0.5 grams of a catalyst comprising 5% palladium composited on charcoal is added thereto. The mixture is then reduced under a hydrogen pressure of 50 psig. until hydrogen ceases to be adsorbed. The reaction mixture is recovered and treated by filtration, the addition of sodium hydrosulfite and finally precipitation by the addition of sulfuric acid. The crystalline solid is separated, filtered, washed and dried to yield the desired product comprising o-aminobenzoic acid.

EXAMPLE VI

In this example the method substantially as described in Example I is utilized except that an aqueous solution of 0.29 equivalents of sodium carbonate is employed instead of sodium hydroxide to dissolve the nitrobenzoic acid and form the sodium salt thereof.

I claim as my invention:

1. In a process for the hydrogenation of a nitrobenzoic acid, the improvement which comprises hydrogenating said nitrobenzoic acid at a hydrogen pressure less than about 100 psig. and at a pH of from about 5 to about 7 in the presence of a hydrogenation catalyst in a solution consisting essentially of said acid dissolved in an aqueous solution of from about 0.95 to about 1.0 equivalents of an alkali metal hydroxide, carbonate or bicarbonate.

2. The process of claim 1 further characterized in that said process is effected at a reaction temperature in the range of from about 50° To about 100° C.

3. The process as set forth in claim 1 in which said hydrogenation catalyst is a supported noble metal catalyst.

4. The process as set forth in claim 1 in which said hydrogenation catalyst is palladium or platinum composited on charcoal.

5. The process as set forth in claim 1 in which an alkali metal salt of said nitrobenzoic acid is formed by reacting said acid with an aqueous solution of an alkali metal hydroxide, carbonate or bicarbonate to form said alkali metal salt of said nitrobenzoic acid, adjusting the pH of said solution to from 5 to about 7 and thereafter subjecting said solution to hydrogenation.

6. The process as set forth in claim 1 in which said nitrobenzoic acid is selected from the group consisting of o-, m- and p-nitrobenzoic acids.

7. The process as set forth in claim 1 in which said alkali metal hydroxide is selected from sodium hydroxide and potassium hydroxide.

8. The process as set forth in claim 1 in which said alkali metal carbonate is sodium carbonate or potassium carbonate.

9. The process as set forth in claim 1 in which said alkali metal bicarbonate is sodium bicarbonate or potassium bicarbonate.

10. The process as set forth in claim 1 in which decolorizing charcoal is included in the reaction mixture.

* * * * *